Figure 1:
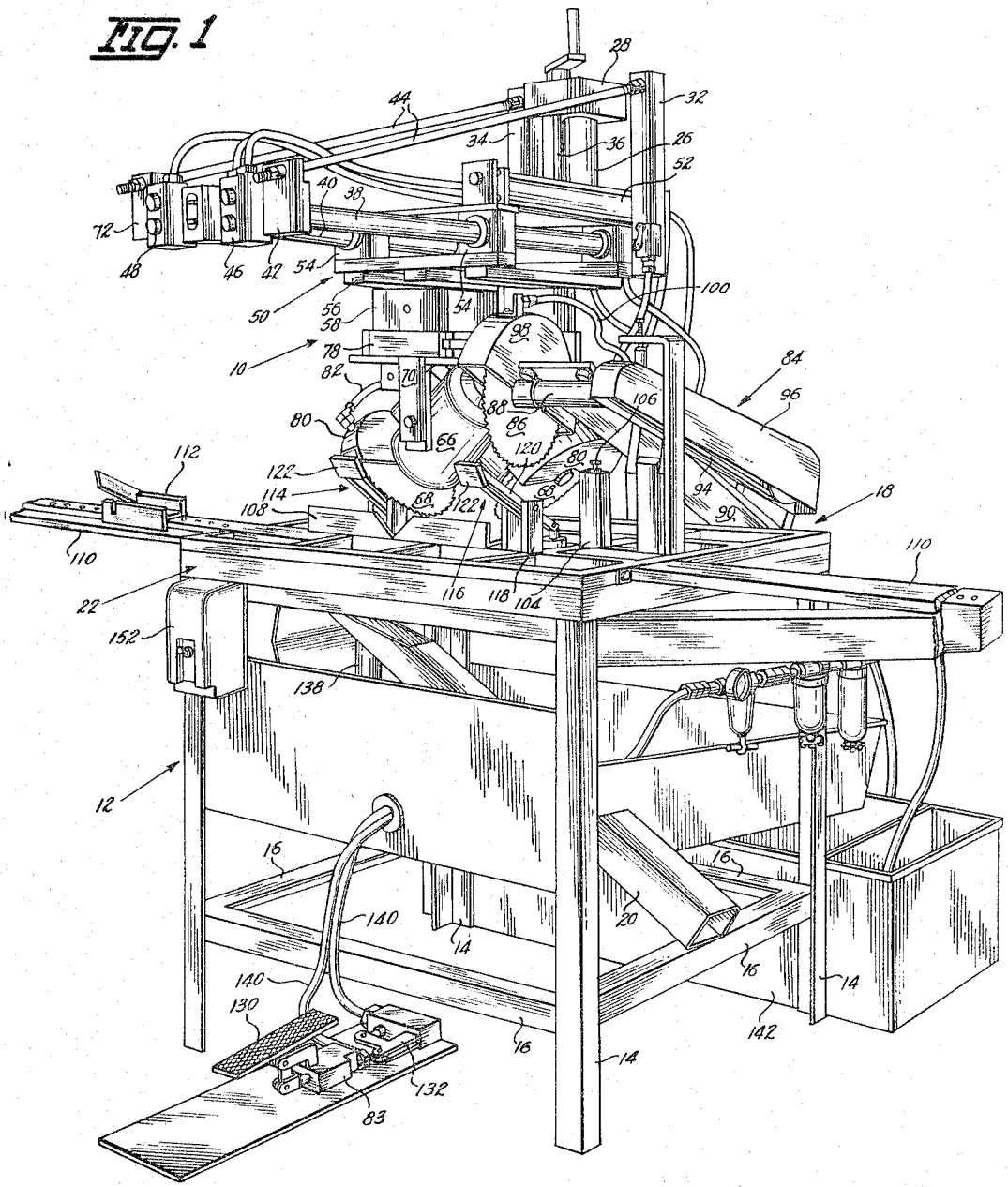

Jan. 17, 1967 E. C. GILBERT 3,298,097
SAWING MACHINE

Filed April 18, 1966 5 Sheets-Sheet 1

INVENTOR.
EVERETT C. GILBERT

BY *Morton S. Adler*

ATTORNEY.

Jan. 17, 1967 E. C. GILBERT 3,298,097
SAWING MACHINE
Filed April 18, 1966 5 Sheets-Sheet 3

INVENTOR.
EVERETT C. GILBERT
BY *Morton L. Adler*
ATTORNEY.

INVENTOR.
EVERETT C. GILBERT
BY
ATTORNEY.

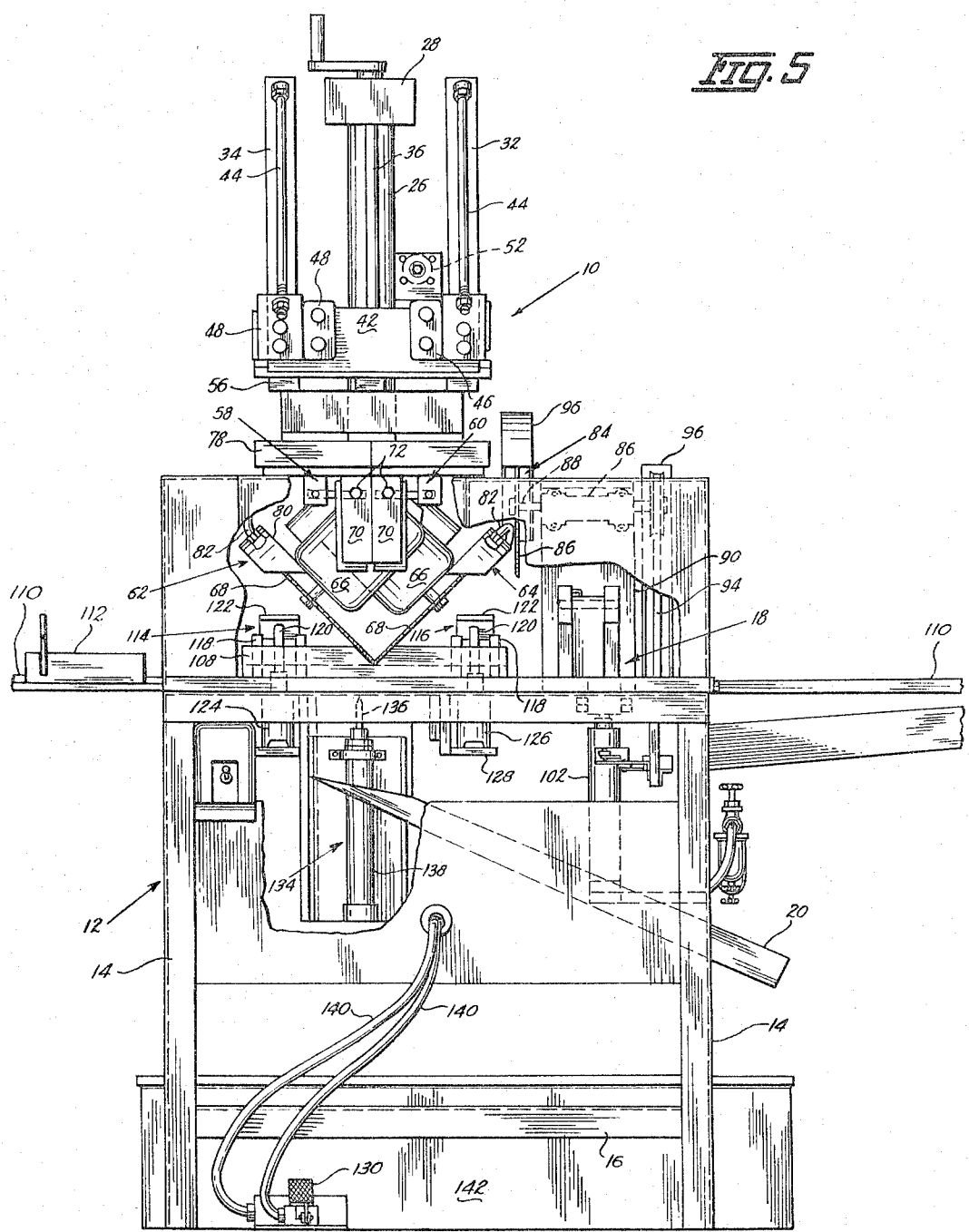

United States Patent Office 3,298,097
Patented Jan. 17, 1967

3,298,097
SAWING MACHINE
Everett C. Gilbert, Steele, Mo., assignor to Beecee Manufacturing and Supply Company, Inc., Malden, Mo., a corporation of Missouri
Filed Apr. 18, 1966, Ser. No. 543,182
10 Claims. (Cl. 29—564)

This invention relates to improvements in a sawing machine utilizing multiple rotary blades and more particularly is designed for sawing special miters in irregular extruded shapes of metal pieces such as are used in forming frames for doors and windows, canopy vents, molding or associated objects.

This invention has special utility in the art of forming frames for aluminum doors and windows where extruded rails, for example are notched or mitered to permit their folding at the point of notching or mitering in order to form a frame corner. Presently, this is accomplished by the use of dies and also by certain other sawing machines or methods which have certain disadvantages that are overcome by this machine. For example, in the use of dies, a separate die is required for different sizes of cuts and if the material to be cut is tubular or otherwise includes hollow areas as may be present in many extrusions, the use of dies is impractical. With certain sawing machines presently in use where multiple blades simultaneously act on the material, there is a residue strip that must be removed from the cut.

Accordingly, in the present invention, one of the important objects contemplated is a sawing machine embodying an overhead radial construction using a pair of powered angularly disposed rotary saw blades arranged in tandem whereby the path of one blade will overlap the path of the other blade to leave a clean notch or miter in the cut material.

Another object herein includes a sawing machine as characterized which is designed to receive different types and styles of door and window frame forming material to be notched or mitered.

A further object is the provision of an automatically operated drill assembly synchronized with the movement of the tandem saws to drill a hole adjacent the miter cut for receiving a screw after the material is bent on the miter to form a corner and thus provide means for securing the adjacent frame portions together.

Still another object inherent herein is the provision of suitable gauge means and a power operated separate rotary saw for cutting off the frame material to a predetermined length and including interlocking means between such separate saw and the mitering saws so that they cannot be activated simultaneously.

A further object is the provision of a sawing machine of the above class wherein the saws are adjustable relative to each other and also relative to the material being worked upon.

Still further objects contemplated herein include a machine as described which is durable in construction and capable of extreme accuracy and speed in carrying out its intended function.

Figure 2:
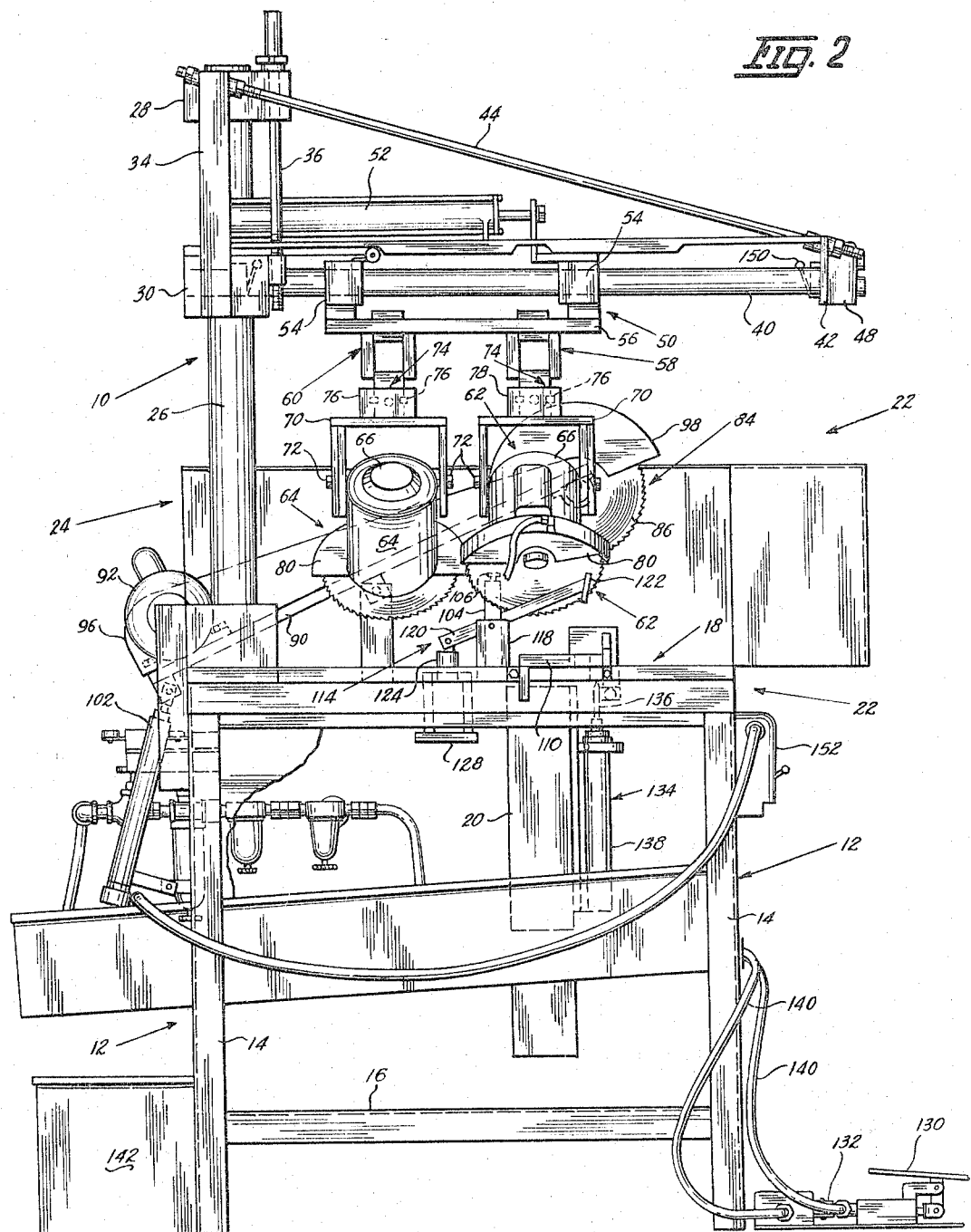
Figure 3:
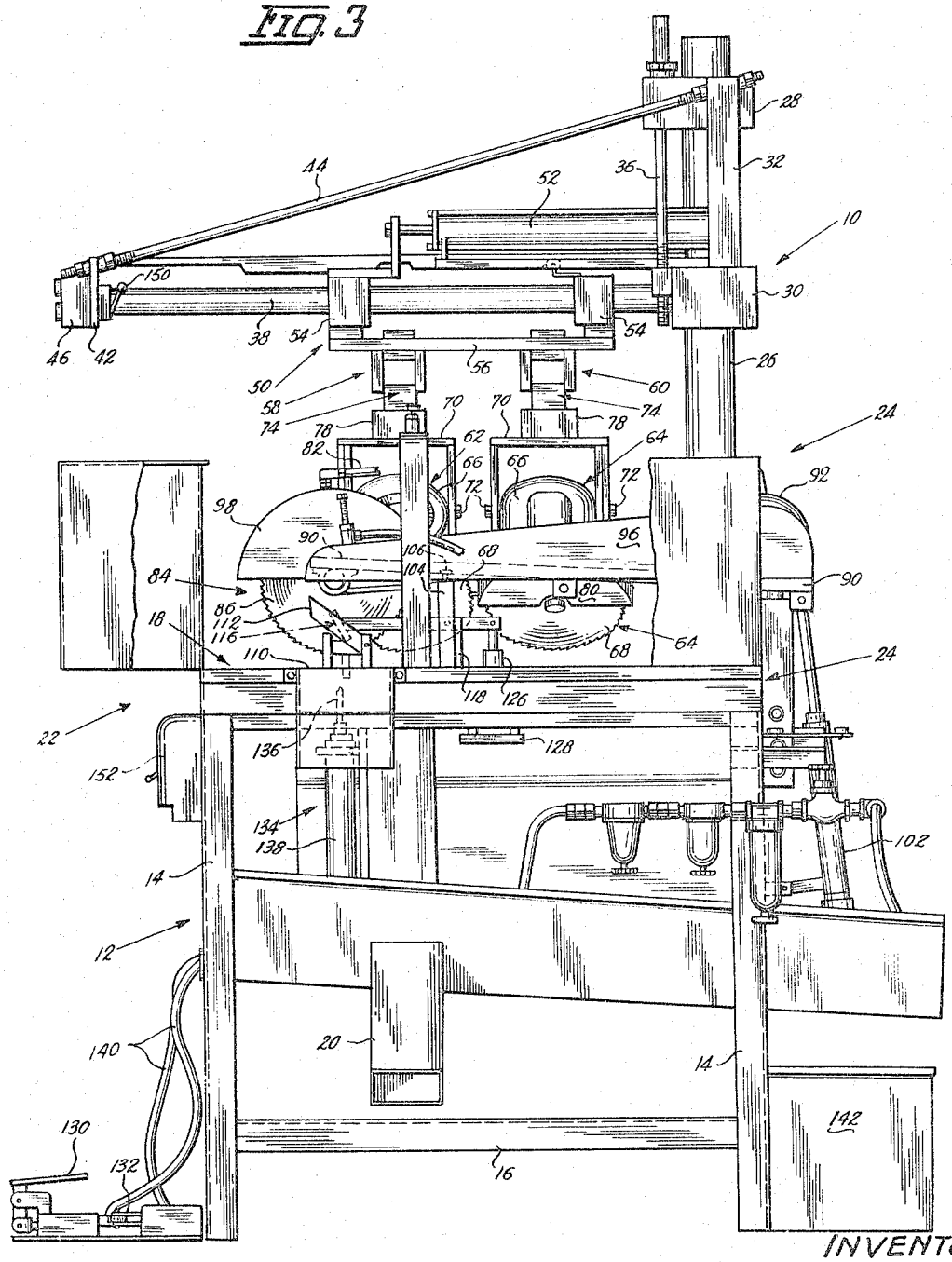
Figures 4, 6:
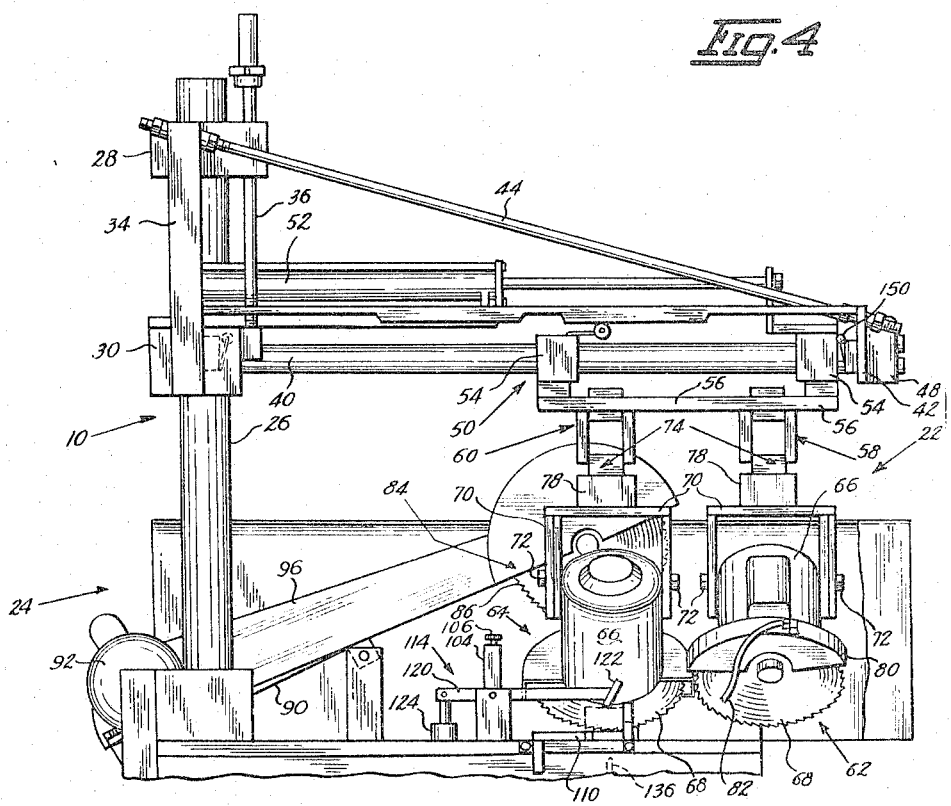

To attain these objects and such further objects as may appear herein, or be hereinafter pointed out, reference is made to the accompanying drawings forming a part hereof, in which:

FIG. 1 is a front perspective view showing a preferred embodiment of this invention, FIG. 2 is a side elevational view with the saws shown in their up or non-operating position, FIG. 3 is a side elevational view opposite to that shown in FIG. 2 and with the saws in their rearward position, FIG. 4 is a side elevational view similar to FIG. 3 but excluding the table and showing the angular saws in their forward position with the vertical saw in the up position, FIG. 5 is a front elevational view showing the tandem angular saws in down position and the vertical cut-off saw in the up position, FIG. 6 is a wiring diagram of the circuitry used with this machine, and FIG. 7 is a schematic illustration of the air system associated therewith.

Referring to the drawings, the sawing mechanism designated generally by the numeral 10 is supported upon a suitable table 12 comprising the legs 14, braces 16 and top 18. Top 18 is of a grate type as best seen in FIG. 1 so as to permit scrap to readily fall in the scrap chute 20. Preferably, table 12 is approximately thirty-six inches high but, of course, this may be varied if desired. For purposes of further description, table 12 will be referred to at times relative to its front side 22 and rear side 24 as best seen in FIGS. 2 and 3.

At the rear side 24 of table 12 there is suitably anchored an upstanding cylindrical post 26 on which there is slidably and rotatably mounted the vertically spaced block-like clamps 28 and 30. Such clamps are connected by the spaced parallel brace mounts 32 and 34 and can be tightened or loosened by means of the crank bolt 36 interconnecting them. The lower end of each brace mount 32 and 34 carries one end of the respective shafts or rails 38 and 40 which extend horizontally in parallel relationship toward and slightly beyond the front end 22 of table 12 where they are secured to opposite end portions of the horizontal brace 42 as best seen in FIG. 1. Respective end portions of brace 42 are connected for support to the respective upper ends of the brace mounts 32 and 34 by the tie rods 44 and brace 42 carries the electrical switches 46 and 48 which will be referred to later.

A carriage assembly 50 (FIG. 1) is slidably journalled on shafts 38 and 40 for movement toward and away from the front end 22 of table by means of the air cylinder 52 and for this purpose, assembly 50 defines a more or less square frame structure having the corner bearings 54 interconnected by suitable bracing 56 so that the bearings 54 are journalled on shafts 38 and 40 as shown. Cylinder 52 is mounted to the top of the carriage assembly 50 and also to the bracing for the clamps 28 and 30 and is a part of the air system as seen in FIG. 7.

Depending from the lower bracing of carriage 50 are the two bracket units 58 and 60 as best seen in FIGS. 2–4 which are arranged in tandem relative to the front 22 and rear 24 of table and carry the respective saw assemblies 62 and 64. Such saw assemblies are similarly constructed and in the following description, like parts are given like numerals. Assemblies 62 and 64 include a motor 66 to which there is attached the rotary cutting blade 68, and motor 66 is mounted to the depending inverted U-shaped support 70 by bolts 72 so that it can be angularly adjusted as required for each blade 68 to move on a path for forming the complementary bevel sides of the cut as will be referred to later. Supports 70 are vertically adjustably arranged relative to the respective bracket units 58 and 60 by means of the slide members 74 and thus far described it will be appreciated that carriage assembly 50 can be raised or lowered by operation of the crank bolt 36 where a major adjustment might be required to process a part and a fine vertical adjustment can be accomplished by the slide members 70. The angular position of the saws to each other are determined as described above and slide assemblies 70 include a keyed connection 76 to a fitting 78 (FIG. 2) on supports 70 for fine horizontal adjustment of the saws. Each of the saw assemblies 58 and 60 are provided with suitable blade guards or shields 80 and oil lines 82 for lubricating the blades in a well known manner.

A third saw assembly 84 as best seen in FIG. 1 is what I have called the cut-off saw for initially cutting the work piece to the desired length as will appear and includes the vertically disposed rotary blade 86 attached to the horizontal shaft 88 which in turn is operatively associated with an arm 90 (FIG. 2) that is pivotally attached at the rear side 24 of table 12. A motor 92 also at the rear 24 is connected by a belt 94 to a pulley (not shown) that is connected to shaft 88 for operating blade 86. Belt 94 is covered by shield 96 and likewise blade 86 has a shield 98 together with the oil line 100. In inoperable position, blade 86 is elevated above the table top 18 as seen in FIGS. 1, 2 and 4 and vertical reciprocation of blade 86 toward and away from the table top is provided by means of the air cylinder 102 at the rear 24 and operatively connected to arm 90 as seen in FIGS. 2 and 3. A stop means 104 on top 18 (FIG. 1) has an adjusting screw 106 to limit the downward travel of blade 86 as desired.

On the top 18 there is secured a notched fitting 108 disposed transversely of the tandem alignment of blades 68 and designed for receiving different types of door and window framing material. In alignment with fitting 108 and projecting from opposite sides of table 12 is the gauge bar 110 which supports the length of the material being worked and, to the left as viewed in FIG. 1, is provided with one or more suitable stops 112 that can be preset for desired lengths of such material. Also on table top 18 are a pair of like pneumatically operated material clamping members 114 (FIG. 2) and 116 (FIG. 3) which are disposed on respective opposite sides of the line of travel of saw blades 68 which are designed to grip the material being worked. With like parts being given like numerals, clamping members 114 and 116 each include a pair of spaced parallel upstanding standards 118 between which there is pivotally secured an elongated lever 120 at a point intermediate its ends. The forward end of each lever carries a respective clamp plate 122 and the respective rear ends are pivotally attached to the respective air cylinders 124 and 126 which are supported as seen in FIG. 2 by the mounting 128 secured to table 12. Cylinders 124 and 126 are activated by the closing of switch 132 which is accomplished by depressing foot pedal 130 as will later be referred to in more detail.

Below the table top 18 and aligned with the notched portion of fitting 108 there is suitably mounted the electro-pneumatic drill assembly designated generally by the numeral 134 as best seen in FIG. 5. Assembly 134 includes the electrically actuated pneumatic drill bit 136 which is vertically reciprocated in a predetermined sequence, as will appear, by the air cylinder 138. Cylinder 138 is connected by means 140 to the switch 132 which is controlled by foot pedal 130 to effect the operation of bit 136.

A water tank 142 (FIG. 1) is designed to hold a suitable coolant for keeping the saws cool during sawing operations in a well known manner and it will be understood that a suitable pump and flow lines are provided for this purpose.

With reference to FIG. 6, certain switching components in the wiring diagram will be identified and will be more particularly referred to in the description of the operation of this machine which follows later. The return switch 150 is associated with the operation of air cylinder 78 for the mitering saws and more particularly the location of this switch can be seen in FIGS. 3 and 4. A main power switch is identified by numeral 152 and switches 144, 146 and 148 are utilized as will appear in the operation of the mitering saws and the cutoff saw and the interlocking relationship between the two whereby such saws cannot be operated simultaneously.

*Operation*

In the operation of this machine, the material to be processed is supported and positioned on the gauge bar 110 with one end located against the stop 112 which can be preset to the desired position. The foot pedal 130 is then operated to actuate the air cylinders 124 and 126 which control clamp members 122 that move to bear against the material to be processed. The cutoff saw assembly 84 is activated by energizing switch 46 at which time switch 144 is open and blade 86 moves to cut the material to the desired overall length. During this operation the circuit to the miter saws is open and such saws will not operate. At the lower point of movement of the saw blade 86, switch 146 is closed and such saw returns to its starting position.

At this point, the foot pedal 130, which is a toggle type switch, can be operated to unclamp the work piece so that the material can then be reset on the gauge bar to any desired position for the cutting of the notch by the miter saws. Pedal 130 is then reoperated to reclamp the material and switch 48 is manually operated causing switch 148 to open and thus open the circuit to the cutoff saw. The closing of switch 48 causes the air cylinder 52 to advance the miter saws through the material to be cut. At the time of the operation of the foot pedal 130, the micro switch 132 is closed and this energizes the solenoid for the automatic self-contained electro-pneumatic drill 136 which goes through a complete cycle of rising to drill a hole in the cut material. The travel of the cylinder assembly 52 is toward the front end 22 of this machine until it contacts switch 150 whereby such cylinder returns to its normal starting position.

The carriage for the miter saws can be lowered or elevated by means of loosening clamps 28 and 30 and turning screw 36 where any major adjustments are desired. A fine vertical adjustment of the mitering saws can be accomplished by raising or lowering elements 58 and 60. The air cylinder speeds are controlled by metering valves and the pneumatic system is lubricated through air line oilers in a well known manner. Likewise a suitable air pressure regulator is provided in the air lines. After the notching or mitering of each piece of material, the operation of this machine is repeated as described for successive pieces of material.

From the foregoing it is thought a full understanding of construction and operation of this invention will be had and the advantages of the same will be appreciated.

It will be understood that the phraseology employed herein is for the purpose of description and not for limitation and that modifications and changes can be made within the scope of what is claimed, without departing from the spirit and purpose thereof.

I claim:

1. A sawing machine, comprising
   a support table having a front and rear side,
   a vertical post at the rear side of said table,
   adjustable clamp means slidably and rotatably mounted on said post,
   shaft means carried by said clamp means and extending therefrom horizontally toward and beyond the front side of said table,
   a carriage slidable on said shaft means,
   a pair of motor mounted rotary saw blades dependingly disposed relative to said carriage for movement therewith and arranged in tandem alignment relative to their direction of travel,
   means to angularly adjust said saw blades relative to each other,
   means on said table near said front side to receive material to be sawed,
   clamp means on said table to releasably secure material to be sawed,
   said saw blades being disposed so that the path of the following blade relative to movement toward said front side intersects the path of the leading blade,
separate electrically actuated pneumatic means for respectively operating said carriage and said clamp means,
a third rotary saw blade,
means supporting said third saw blade for vertical reciprocation relative to said table,
stop means on said table to limit the movement of said third saw towards said table,
means for actuating said third saw, and
electrically actuated pneumatic means for moving said third saw blade toward and away from said table.

2. A machine as defined in claim 1 including,
an electrically activated pneumatic drill carried by said table,
pneumatic means to vertically reciprocate said drill while it is in operation, and
switch means synchronized with the movement of said first two mentioned saw blades whereby said drill is actuated to act upon and drill a hole in the material being worked.

3. A machine as defined in claim 1 including,
a manual switch for initially activating said pneumatic means for said carriage, and
switch means on said shaft means acted against by said carriage at a predetermined point whereby the direction of movement of said carriage is reversed to return it to its starting position.

4. A machine as defined in claim 1 including means interlocking said first two saw blades and said third saw blade so that they cannot be operated simultaneously.

5. A machine as defined in claim 1 including an electric circuit and switch means in said circuit interconnected with said first two saw blades and said third saw blade so that they cannot be operated simultaneously.

6. A machine as defined in claim 1 including adjustable gauge means on said table for measuring predetermined lengths of material to be processed.

7. A sawing machine comprising,
a table having a front and rear side,
a support member on the rear of said table,
a pair of motor mounted tandem aligned rotary saw blade assemblies,
vertically adjustable means mounting said pair of rotary saw blade assemblies to said support member,
means carried by said support member for effecting horizontal movement of said rotary saw blade assemblies toward and from the front of said table,
means to angularly adjust the blades of said rotary saw blade assemblies relative to each other,
power operated clamp means on said table to secure material acted upon by said rotary saw blade assemblies,
said saw blades being disposed so that the path of the following blade relative to movement toward said front side intersects the path of the leading blade,
separate electrically actuated pneumatic means for respectively moving said rotary saw blade assemblies and said clamp means,
a drill carried by said table,
pneumatic means to vertically reciprocate said drill while it is in operation, and
switch means synchronized with the movement of said rotary saw blades whereby said drill is actuated to act upon and drill a hole in the material being worked.

8. A machine as defined in claim 7 including:
a third rotary saw blade,
means supporting said third saw blade for vertical reciprocation relative to said table,
stop means on said table to limit the movement of said third saw towards said table,
means for actuating said third saw, and
electrically actuated pneumatic means for moving said third saw blade toward and away from said table.

9. A machine as defined in claim 7 including:
a manual switch for initially activating said pneumatic means for moving said rotary saw blade assemblies, and
switch means acted against by said rotary saw blade assemblies at a predetermined point whereby the direction of movement of said assemblies is reversed to return them to their starting position.

10. A machine as defined in claim 8 including an electric circuit and switch means in said circuit interconnected with said pair of rotary saw blade assemblies and said third rotary saw blade so that they cannot be operated simultaneously.

No references cited.

RICHARD H. EANES, JR., *Primary Examiner.*